(12) United States Patent
Cohen et al.

(10) Patent No.: US 7,904,243 B2
(45) Date of Patent: Mar. 8, 2011

(54) REAL-TIME DATA AIDING FOR ENHANCED GPS PERFORMANCE

(75) Inventors: Clark Cohen, Washington, DC (US); Bart Ferrell, Troy, IL (US); Greg Gutt, Leesburg, VA (US); David Whelan, New Port Coast, CA (US)

(73) Assignee: The Boeing Company, Chicago, IL (US)

( * ) Notice: Subject to any disclaimer, the term of this patent is extended or adjusted under 35 U.S.C. 154(b) by 1525 days.

(21) Appl. No.: 10/873,581

(22) Filed: Jun. 22, 2004

(65) Prior Publication Data

US 2005/0159891 A1 Jul. 21, 2005

Related U.S. Application Data

(60) Provisional application No. 60/536,788, filed on Jan. 15, 2004.

(51) Int. Cl.
*G01C 21/00* (2006.01)

(52) U.S. Cl. ......... 701/214; 701/200; 701/213; 701/216; 701/220; 342/350; 342/356; 342/357.25; 342/357.28; 342/357.3; 342/357.32

(58) Field of Classification Search .................. 701/200, 701/213, 214, 216, 217, 220, 221; 342/357.06, 342/357.16, 357.01, 357.15, 353
See application file for complete search history.

(56) References Cited

U.S. PATENT DOCUMENTS

| | | | | |
|---|---|---|---|---|
| 5,345,245 A | * | 9/1994 | Ishikawa et al. | 342/357.03 |
| 5,944,770 A | * | 8/1999 | Enge et al. | 701/207 |
| 6,040,798 A | * | 3/2000 | Kinal et al. | 342/357.01 |
| 6,178,195 B1 | * | 1/2001 | Durboraw et al. | 375/136 |
| 6,246,363 B1 | * | 6/2001 | Yung et al. | 342/357.14 |
| 6,252,545 B1 | * | 6/2001 | Da et al. | 342/357.1 |
| 6,373,432 B1 | * | 4/2002 | Rabinowitz et al. | 342/357.16 |
| 6,674,398 B2 | * | 1/2004 | Murphy | 342/357.01 |
| 2001/0045903 A1 | * | 11/2001 | Chang et al. | 342/357.01 |
| 2002/0058578 A1 | * | 5/2002 | de La Chapelle et al. | 455/13.4 |
| 2002/0193108 A1 | * | 12/2002 | Robinett | 455/427 |
| 2004/0210389 A1 | * | 10/2004 | Zimmerman et al. | 701/213 |

FOREIGN PATENT DOCUMENTS

GB 2293710 A * 4/1996

OTHER PUBLICATIONS

GPS Pseudolites: Theory, Design, and Applications; Cobb, H. Stewart; Sep. 1997; http://waas.stanford.edu/~wwu/papers/gps/PDF/Thesis/StewartCobbThesis97.pdf.*

* cited by examiner

*Primary Examiner* — Khoi Tran
*Assistant Examiner* — Nikhil Sriraman
(74) *Attorney, Agent, or Firm* — Yee & Associates, P.C.; Robert B. Parker (57) ABSTRACT

Data from GPS satellites within the field of view of a ground station are retransmitted to LEO satellites, such as Iridium satellites, and cross-linked if necessary before being transmitted to a user. The user is then able to combine the fed-forward data with data received directly from GPS satellites in order to resolve errors due to interference or jamming. Iridium and data aiding thus provides a means for extending GPS performance under a variety of data-impaired conditions because it can provide certain aiding information over its data link in real time.

9 Claims, 12 Drawing Sheets

REAL-TIME DATA AIDING FOR ENHANCED GPS PERFORMANCE

PRIORITY CLAIM

This application claims priority to provisional application 60/536,788 filed on Jan. 15, 2004 and is incorporated herein by reference.

FIELD OF THE INVENTION

This invention relates generally to systems for enhancing global positioning system performance.

BACKGROUND OF THE INVENTION

GPS, or Global Positioning System, is funded by and controlled by the U. S. Department of Defense (DOD). While there are many thousands of civil users of GPS worldwide, the system was designed for and is operated by the U. S. military. GPS provides specially coded satellite signals that can be processed in a GPS receiver, enabling the receiver to compute position, velocity, and time. Four GPS satellite signals are used to compute positions in three dimensions and the time offset in the receiver clock. The GPS satellite is one of a constellation of approximately twenty-four GPS satellites operated by United States Department of Defense orbiting the Earth approximately twice every twenty-four hours at an altitude of approximately ten thousand miles and traversing the sky above a location on the surface of the Earth in approximately four hours.

Another satellite-based system called Global Orbiting NAvigational SyStem (GLONASS) is being developed and deployed by Russia. The basic goals, functions, and capabilities of the GLONASS are similar to the GPS. Although the present discussion focuses on a GPS-based system, a GLONASS-based system can be used for a similar function with a similar result.

GPS receivers normally determine their position by computing relative times of arrival of signals transmitted simultaneously from a multiplicity of GPS (or NAVSTAR) satellites. These satellites transmit, as part of their message, both satellite positioning data as well as data on clock timing, so-called "ephemeris" data.

The GPS satellites transmit two microwave carrier signals. The L1 frequency (1575.42 MHz) carries the navigation message and the Satellite Positioning Service (SPS) code signals. The L2 frequency (1227.60 MHz) is used to measure the ionospheric delay by Precise Positioning System (PPS) equipped receivers. There are two principal functions of GPS receiving systems: (1) computation of the pseudoranges to the various GPS satellites, and (2) computation of the position of the receiving platform using these pseudoranges and satellite timing and ephemeris data. The pseudoranges are simply the time delays measured between the received signal from each satellite and a local clock. The satellite ephemeris and timing data is extracted from the GPS signal once it is acquired and tracked.

Virtually all known GPS receivers utilize correlation methods to compute pseudoranges. These correlation methods are performed in real time, often with hardware correlators. GPS signals contain high rate repetitive signals called pseudorandom (PN) sequences. The codes available for civilian applications are called C/A codes, and have a binary phase-reversal rate, or "chipping" rate, of 1.023 MHz and a repetition period of 1023 chips for a code period of 1 msec. The code sequences belong to a family known as Gold codes. Each GPS satellite broadcasts a signal with a unique Gold code.

For a signal received from a given GPS satellite, following a downconversion process to baseband, a correlation receiver multiplies the received signal by a stored replica of the appropriate Gold code contained within its local memory, and then integrates, or lowpass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal with the pseudorandom code removed, or, in common terminology, "despread." This signal is narrow band, with bandwidth commensurate with a 50 bit per second binary phase shift keyed data signal which is superimposed on the GPS waveform. The correlation acquisition process is very time consuming, especially if received signals are weak. To improve acquisition time, newer military GPS receivers are likely to utilize a multiplicity of correlators that allows a parallel search for correlation peaks.

The ability to track low power GPS signals is important for a number of real-time applications, including cases where the GPS signal may be attenuated, jammed, or subject to interference. Previous approaches to these obstacles have included to varying degrees (i) signal processing to enhance sensitivity, (ii) controlled radiation pattern antennas (CRPAs) to thwart jamming, and (iii) control of the receiving environment, if possible, to ward off interference. Unfortunately, in many of these cases, only limited performance improvement is feasible due to practical constraints.

In the case of (i) signal processing, the fundamental limit to increased performance is established by the data bit boundaries in the GPS message. The intrinsic GPS data broadcast rate is 50 bits per second. Ordinary receivers cannot integrate the signal across these 20 ms intervals. Extension of the integration interval would actually lead to a decrease in performance because the data bits will appear as random noise that averages to zero. Therefore, a general practical limit is 20 ms averaging.

Some practitioners have tried to push this limit by squaring the GPS signal. However, squaring is an inefficient means of recovering information because the noise is mixed with itself, resulting with a significant baseband noise component superimposed over the squared signal at baseband. Other techniques have been devised that employ data stripping—the local application of limited a priori knowledge of the GPS bit sequence that takes advantage of a tendency in GPS to often repeat the same sequence multiple times—in order to remove the GPS data and obtain longer integration times. Unfortunately, this technique can often provide marginal results—especially in critical applications. The main shortcoming is that it completely falls apart when the GPS message changes, and this occurrence is frequent and unpredictable.

Prior processing efforts have also taught away from the current invention of employing feed-forward data to enhance performance. For example, U.S. Pat. No. 6,133,874 teaches that, "Coherent integration beyond 20 milliseconds is normally inadvisable since the presence of a priori unknown 50 baud binary phase shift keyed data (the satellite data message) placed on top of the signal does not allow coherent processing gain beyond one data bit period, or 20 milliseconds." Similarly, U.S. Pat. No. 5,664,734 explains, "If the carrier frequency and all data rates were known to great precision, and no data were present, then the signal-to-noise ratio could be greatly improved, and the data greatly reduced, by adding to one another successive frames .... The presence of 50 baud data superimposed on the GPS signal still limits the coherent summation of PN frames beyond a period of 20 msec."

Null steering antennas (ii) reduce jamming by identifying the direction of origin of a jammer, then spatially notching out all signals in that direction. What remains is the unjammed GPS signals that come from other directions. With additional phased array electronics, it is also possible to create more tightly focused beams on individual GPS satellites, thereby increasing signal strength. While the jamming protection of CRPAs is excellent, such antennas are often heavy, bulky, and expensive.

Last, controlling the receiving environment to minimize interference sources (iii) is often involved because it must be carried out under a regulatory regime. For example, ultrawideband (UWB) devices have already been shown to interfere with certain GPS devices on occasion. There is a general desire to have both of these devices coexist—the potential user base is fundamentally the same. In the best of all worlds, a regulatory environment will exist that will enable UWB to coexist with GPS and other incumbent bands. However, in spite of best efforts to create and conform to such a regulatory environment, there will always be deviations that create exceptions to proper performance. It is for these cases that the invention described herein is likely to be most useful, namely, as a "safety net" against unexpected interference.

What is needed is a system that provides robust GPS performance under any of these adverse conditions with a simple solution that does not incur the associated penalties in terms of size, weight, power, and cost.

SUMMARY OF THE INVENTION

In accordance with preferred embodiments of the present invention, data from GPS satellites within the field of view of a ground station are retransmitted to LEO satellites, such as Iridium satellites, and cross-linked if necessary before being transmitted to a user. The user is then able to combine the fed-forward data with data received directly from GPS satellites in order to resolve errors due to interference or jamming. Iridium and data aiding thus provides a means for extending GPS performance under a variety of data-impaired conditions because it can provide certain aiding information over its data link in real time.

Applications of the present invention include (but are not limited to) ultra-wide-band interference protection, anti-jam protection, and enhanced ability to use GPS indoors.

Ultra-Wide-Band (UWB) Interference Protection.

Many consumer and business local networks are beginning to employ UWB for wireless communication. Because of its likely popularity among business travelers, UWB is also a candidate for air travel such as Boeing's Connexions service. Unfortunately, UWB also happens to be an interference risk to GPS since it is partially overlaid on the GPS frequencies. The GPS and aviation communities are making every effort through the FCC to create a regulatory guardband between GPS and UWB so that the two can coexist. But even with a regulatory guardband, it is possible that incidental UWB emissions onboard an aircraft could interfere with onboard GPS navigation equipment. Iridium data supplied in real time to the aircraft anywhere in the world would provide enough information to allow for continued tracking of the GPS signal—even in the presence of UWB interference.

Antijam Protection.

Jamming in battlefield environments is also a key consideration. A stand-alone Y-code GPS receiver can typically withstand a Jamming to Signal (J/S) ratio up to 50 dB before it will lose lock. Iridium data supplied to a user receiver in real time could provide the user with significant enhancements in antijam performance over a stand-alone receiver.

Indoor Operations.

The strong Iridium signal could be used to transmit aiding information in real time to a GPS receiver inside a building that can only access attenuated signals.

The system described herein is directed towards maintaining carrier and pseudorange lock in the presence of interference, jamming, or reduced signal strength. Typical parameters required to acquire a GPS satellite include knowledge of its pseudorandom noise code phase, Doppler shift, and user clock offset. In the absence of data modulation on the GPS signal, for a given signal strength and uncertainty in acquisition parameters, there is a standard tradeoff between time to acquire and sensitivity. Since one purpose of this invention is to enhance receiver sensitivity, it does not address the acquisition of a signal except to assume that a receiver has already successfully locked onto a signal. Co-pending patent application Ser. No. 10/720,736 (which is hereby incorporated by reference) shows how such acquisition can be carried out under more demanding conditions when an additional 10 dB of processing gain is desirable. The present invention shows how a receiver may continue to track this signal when conditions drive it to be hardly detectable.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
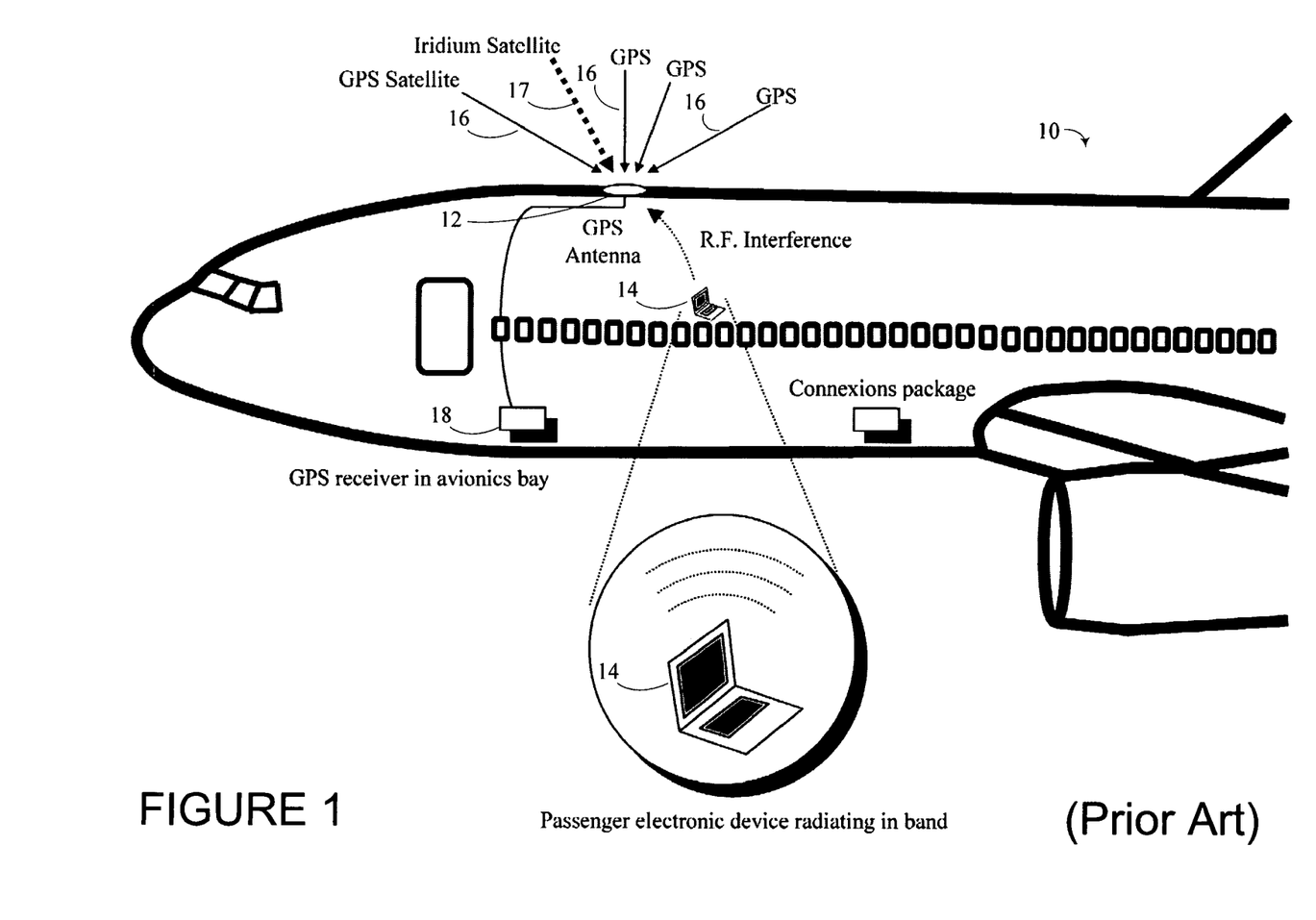
FIG. 1 is a representative view of an aircraft equipped with a GPS receiver and subject to interference.

FIG. 1 shows an example of interference generated within a commercial passenger jet 10 equipped with a GPS antenna 12 and GPS receiver 18. The GPS antenna 12 is capable of receiving GPS signals 16 and LEO satellite signals 17 from those satellites within its field of view.

If a passenger operates a portable electronic device 14 such as a notebook computer, it is possible that this device 14 could emit interference 15 in the GPS band. Through a number of pathways, this interference 15 can reach the GPS antenna 12 on board the aircraft that is being used for navigation. Depending on its strength, the interference 15 could render the GPS receiver useless, possibly jeopardizing the aircraft and its occupants.

Three binary codes shift the L1 or L2 carrier phase. The C/A Code (Coarse Acquisition) modulates the L1 carrier phase. The C/A code is a repeating 1 MHz Pseudo Random Noise (PRN) Code. This code modulates the L1 carrier signal, spreading the spectrum over a 1 MHz bandwidth. The C/A code repeats every 1023 bits (one millisecond). Each satellite has a different PRN C/A code, and GPS satellites are often identified by their PRN number, the unique identifier for each pseudo-random-noise code. The C/A code that modulates the L1 carrier is the basis for the civil SPS.

Authorized users with cryptographic equipment and keys and specially equipped receivers use the Precise Positioning System, or PPS. Authorized users include U. S. and allied military, certain U. S. Government agencies, and selected civil users specifically approved by the U. S. Government. In the PPS, the P-Code (Precise) modulates both the L1 and L2 carrier phases. The P-Code is a very long (seven days) 10 MHz PRN code. In the Anti-Spoofing (AS) mode of operation, the P-Code is encrypted into the Y-Code. The encrypted Y-Code requires a classified AS Module for each receiver channel and is for use only by authorized users with cryptographic keys. The P/Y Code is the basis for the PPS.

A Navigation Message also modulates the L1-C/A code signal. The Navigation Message is a 50 Hz signal consisting of data bits that describe the GPS satellite orbits, clock corrections, and other system parameters. The GPS Navigation Message consists of time-tagged data bits marking the time of transmission of each subframe at the time they are transmitted by the SV. A data bit frame consists of 1500 bits divided into five 300-bit subframes. A data frame is transmitted every thirty seconds. Three six-second subframes contain orbital and clock data. Satellite Vehicle (SV) Clock corrections are sent in subframe one and precise satellite orbital data sets (ephemeris data parameters) for the transmitting SV are sent in subframes two and three. Subframes four and five are used to transmit different pages of system data. An entire set of twenty-five frames (125 subframes) makes up the complete Navigation Message that is sent over a 12.5 minute period.

Ephemeris data parameters describe SV orbits for short sections of the satellite orbits. Normally, a receiver gathers new ephemeris data each hour, but can use old data for up to four hours without much error. The ephemeris parameters are used with an algorithm that computes the SV position for any time within the period of the orbit described by the ephemeris parameter set.

The C/A code is broadcast at 1,575.42 MHz in a 2.046 MHz wide band (complete null to null), and is used for civilian operations and for initial acquisition in military operations. The P/Y code is a wider-band signal spanning 20.46 MHz that provides 10 times higher ranging precision than C/A code commensurate with its higher chipping rate. Often, C/A code is the first casualty of jamming. The 1.023 MHz chipping rate of the C/A code provides some protection, but the 10.23 MHz chipping rate of the P/Y code offers an additional 10 dB of J/S protection. If the jamming is known to be narrow band and to originate within the C/A code frequency band so as to deny enemy use of the C/A code signal component, then even more protection is generally derived by notch filtering the center 2 MHz of the P/Y code input to the receiver.

Figure 2:
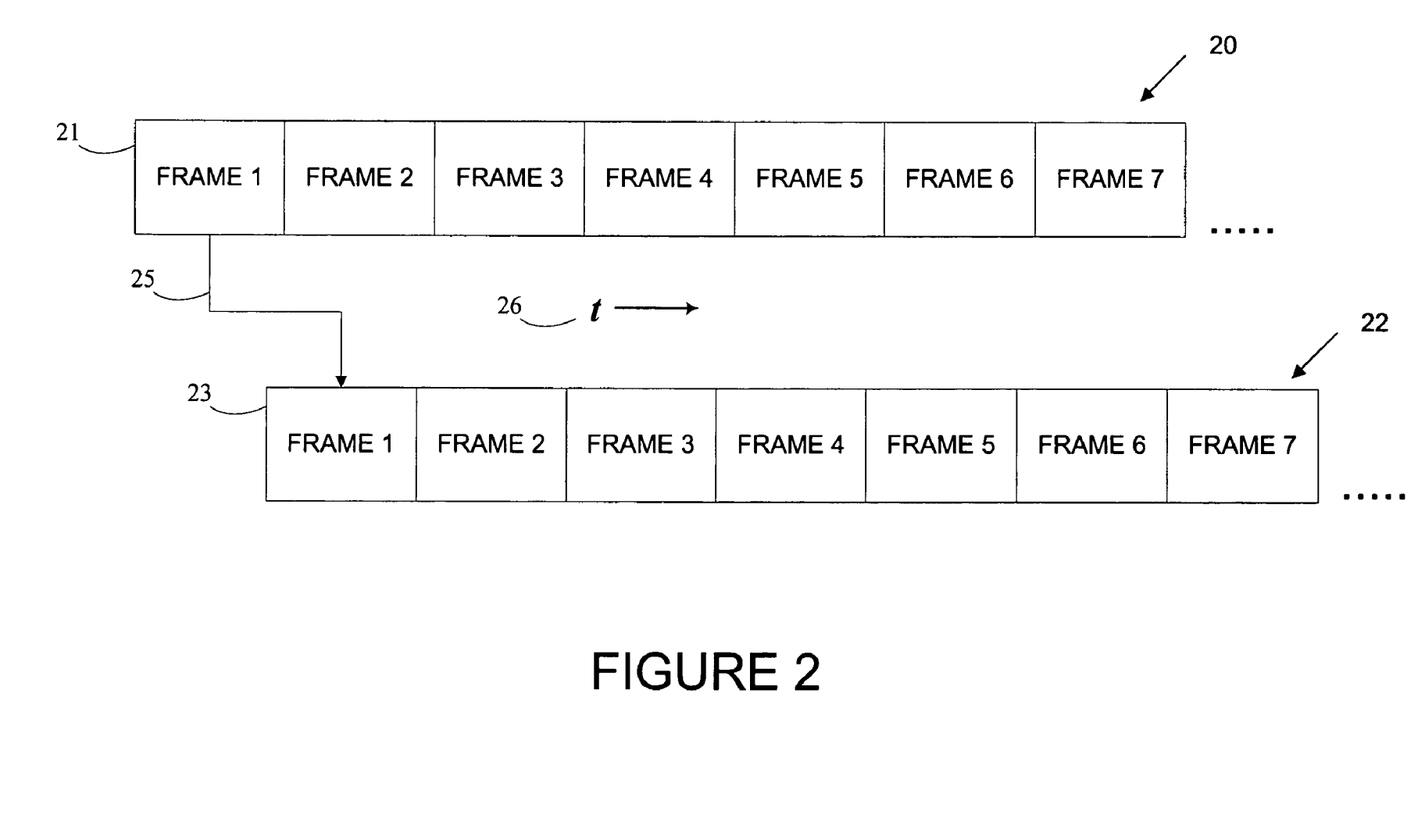
FIG. 2 is an illustration of the timing of real-time and feed-forward GPS signals received by a user.
Figure 3:
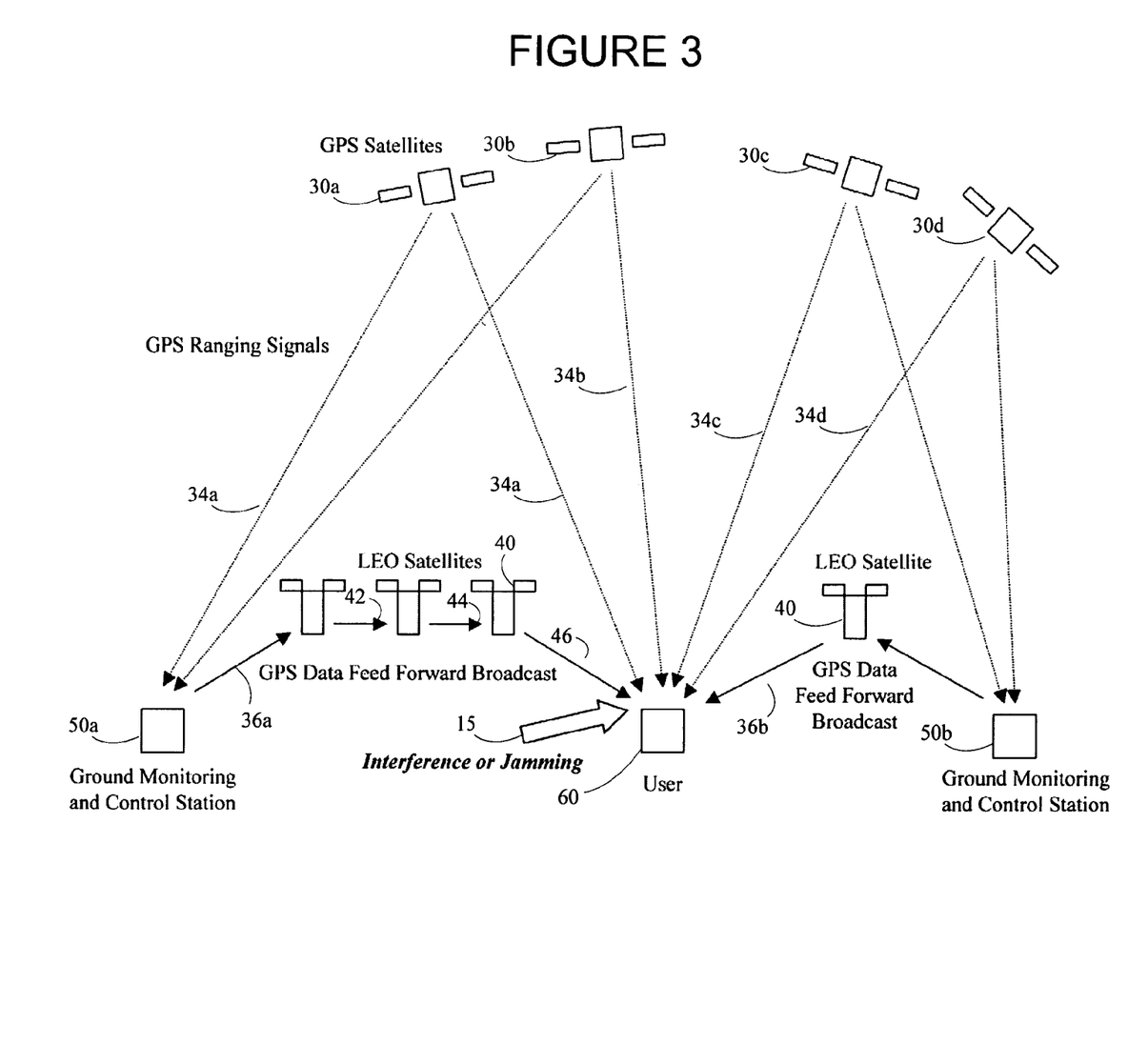
FIG. 3 is a representative view of a system in accordance with the present invention.

Referring to FIGS. 2 and 3, FIG. 2 conceptually illustrates a 50 bps data stream 80 from a first GPS satellite 30*a* (see FIG. 3), received in real time at a user 60 (see FIG. 3). The entire GPS navigation message from either a real time data stream 20 or a relayed feed forward data stream 22 is 25 frames in length, with each frame of the GPS message further divided into 5 subframes that are six seconds, or 300 bits, in length. The feed forward data stream 22 from the same GPS satellite 30*a* contains the identical data, but because of propagation delays through the Iridium system the feed forward stream 22 arrives at the user 60 later than the real time stream 20. As indicated in FIG. 2, the feed forward stream 22 is delayed for a period 26 by a fraction of a single frame such that a frame 21 containing Frame 1 data bears a temporal relation to a frame 23 bearing that same Frame 1 data expressed as a delay period 26. The actual period 26 of the delay will vary, depending on user location with respect to the GPS satellite and ground station. As part of the present invention, the feed forward data 22 is then retrieved from the Iridium data stream and time-aligned with the GPS real time data 20 such that it can be used to enhance the real-time data.

FIG. 3 shows the system architecture in a preferred embodiment of the invention. Reference GPS receivers 50*a, b* are placed on the Earth away from the region of degraded GPS signal conditions of interference, jamming, and attenuation. In a single application, only one or a plurality of such receivers 50*a, b* may be employed. These reference GPS reference receivers track the 50 bps GPS ranging signal data stream 34*a*, 34*b*, 34*c*, and 34*d* for each satellite in view 30*a*, 30*b*, 30*c*, and 30*d* respectively.

In one preferred embodiment an Iridium ground transmitter 50*a*, receives real time data streams from each satellite in view 30*a*, 30*b*, 30*c*, and 30*d* respectively, and telemeters a signal 34*a*, in this case, containing this received GPS feed forward data stream 20 in real time into the Iridium system via the nearest satellite 40. It is not necessary that the ground transmitter be in close proximity as its sole purpose is to place the real time data stream 20 onto the constellation of Iridium satellites, though the relevant satellites will only be those commonly visible to both ground monitoring station 50*a*, 50*b* and the user 60.

A Iridium satellite 40 is one of a constellation of low earth orbit satellites orbiting the Earth at an altitude of a few hundred miles, traversing the sky in about ten minutes. (Throughout this application, Iridium satellites are used as an exemplar of a LEO satellite 17 for purposes of enablement, though there is nothing unique to Iridium that necessarily limits the invention to Iridium satellites. Any LEO satellite with an appropriate data broadcast is suitable for the invention, and therefore this invention is not limited to LEO satellites.)

The bit stream signals 36*a*, 36*b* are encoded into an Iridium broadcast channel. This broadcast message is promulgated throughout the Iridium network via its crosslinks 42, 44. Iridium broadcasts the 50 bps real time data stream for each GPS satellite from each satellite in the Iridium constellation, as indicated in FIG. 3 by a broadcast signal 46 being transmitted from an ultimate Iridium LEO satellite 40. A user receiver 60 in a degraded environment with interference, jamming, or attenuation then has access to these GPS data bits. The user receiver may then apply these GPS data bits to augment the signal processing of its own real time GPS measurements.

Figure 4:
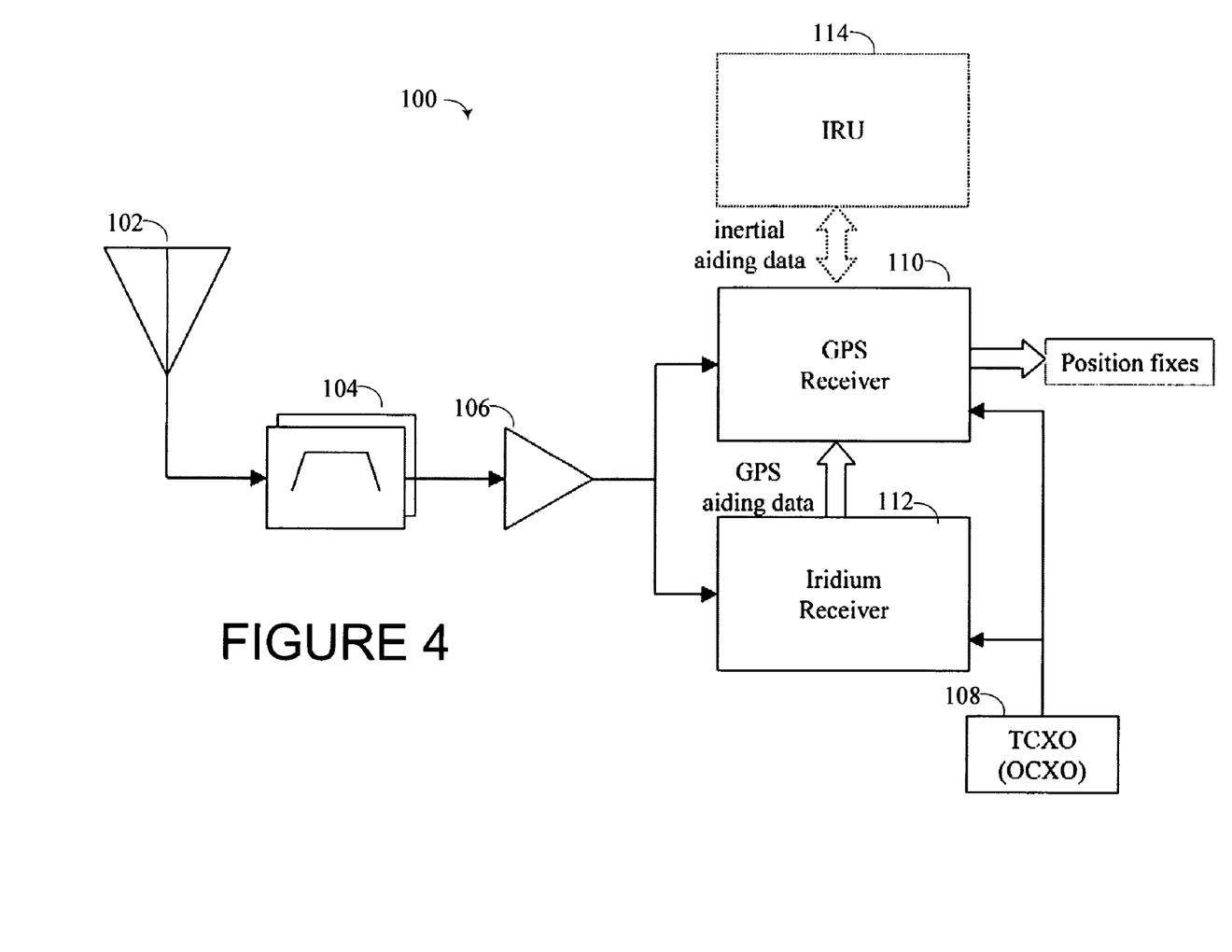
FIG. 4 is a block diagram of a LEO and GPS receiver.

FIG. 4 shows a preferred receiver 100 that receives and demodulates both GPS and Iridium satellite signals. Note that the invention should not be limited to Iridium or any other particular satellite systems. Rather, the system will work equally well by using a receiver for any other satellite system in which GPS data can be retransmitted and fed forward to a user.

The receiver 100 includes a dual band antenna 102, band pass filter 104, and preamp 106. The filter and preamp permit both the L1 and L2 GPS signals to pass along with the Iridium signal, which is close to the L1 signal frequency (1575+/−10.23 MHz for GPS; 1621+/−5 MHz for Iridium). The filtered and amplified signal is passed to a GPS receiver 110 and an Iridium (or other LEO) receiver 112. The Iridium and GPS receivers are tied together with a common clock 108, which is preferably a temperature compensated crystal oscillator.

The GPS receiver 100 produces position fixes as an output, in a manner as discussed above. The GPS receiver also uses GPS aiding data forwarded to it from the Iridium receiver 112 in order to assist in resolving attenuated or missing data at the GPS receiver under interference or jamming conditions. Optionally, the receiver also includes an inertial unit (IRU) 114 in communication with the GPS receiver. The IRU 114 provides inertial motion information to the GPS receiver 110 to enable the GPS receiver 110 to provide accurate and updated position fixes during times of limited data or no data from satellites. Depending on the quality of the IRU, the position fixes from the GPS receiver may continue to be accurate for fairly long periods of time without GPS data following an initial accurate position fix.

Figure 5:
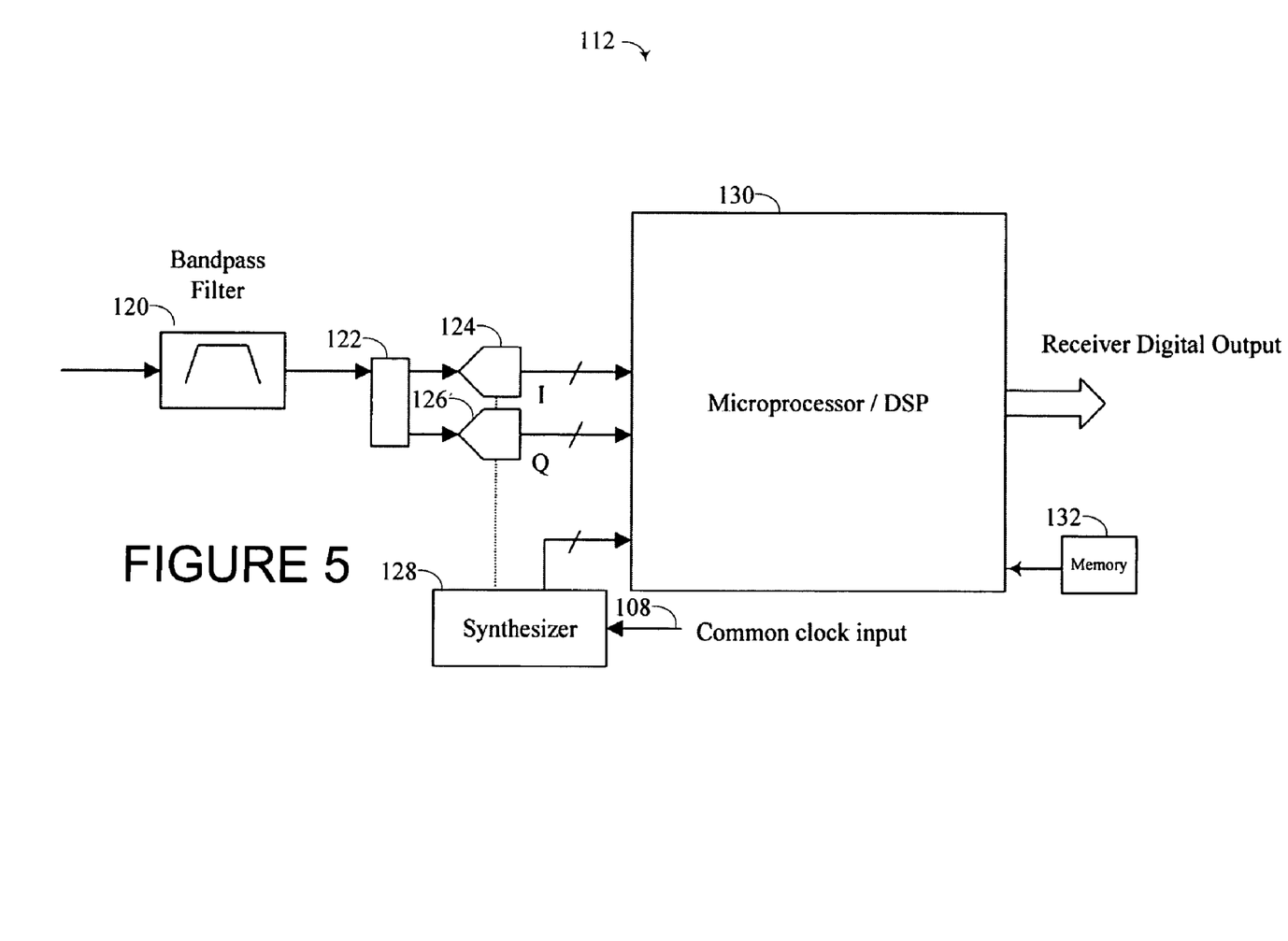
FIG. 5 is a block diagram of a preferred GPS or LEO receiver.

In the preferred embodiment, the satellite signals can be demodulated with a software receiver as shown in FIG. 5. Alternatively, existing Iridium receivers can be obtained and used for this purpose. Nonetheless, the preferred form of this invention employs software for much of the Iridium receiver 112 so as to make it both low cost and easy to maintain and upgrade.

The front end of the receiver 112 includes a bandpass filter 120. In the presently preferred embodiment, the bandpass filter 120 has a 10 MHz passband at 1,621 MHz with a steep cutoff, therefore requiring it to be a high Q filter. New technologies allow sharp filtering to be done at this frequency. The sharp filtering rejects out-of-band interference, such as nearby cellular telephones. An example of the electrical components suitable for this purpose is the specialized RF chip pair contained in IBM GPS receiver IBM43GAENGP0001. This receiver contains an integrated SiGe chip that carries out the bandpass, automatic gains control (AGC), and direct RF sampling functions using 2-bit quantization. Schematically, these functions are illustrated in FIG. 5 as the signal travels from the bandpass filter 120, then is separated into inphase and quadrature components via the hybrid coupler 122. The component signals are passed to inphase and quadrature A/D converters 124, 126. One embodiment downconverts the signal by 46 MHz to the Iridium band. However, it is not critical that direct downconversion be used. It is also possible to employ a traditional quadrature downconversion scheme.

The A/D converters 124, 126 sample the incoming inphase and quadrature signals at 40 MHz. The output is fed directly into a digital signal processor (DSP) 130 (preferably a TMS 320 DSP) which can then process sections of the data to lock onto the Iridium signal, calculate signal phasing and phase rate, and extract the broadcast bits containing the GPS data fed forward by the Iridium satellite. The GPS data bits from the Iridium broadcast message are demodulated in accordance with the Iridium specification. A memory 132 is also provided to store data and computer programming instructions for processing by the DSP 130. The memory 132 may take any of a variety of forms, such as EEPROM chips or other electromagnetic or optical storage devices.

Figure 6:
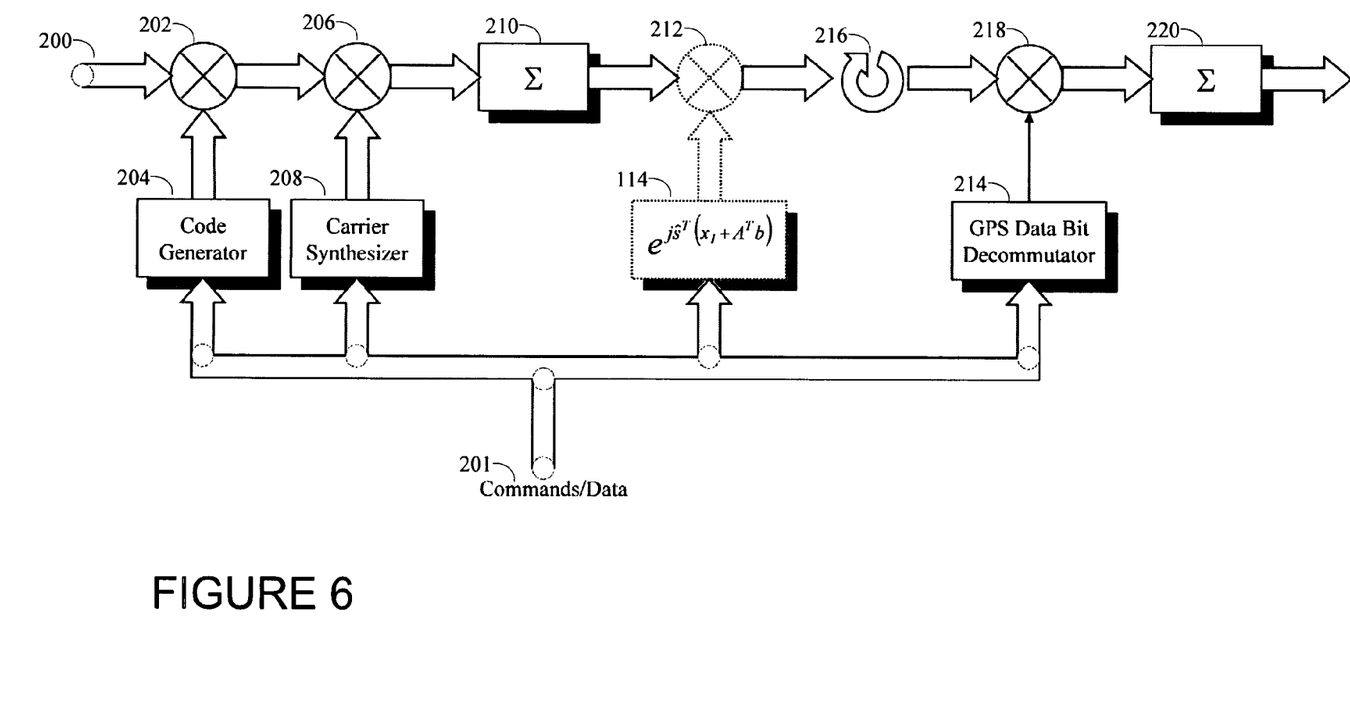
FIG. 6 is a block diagram of the preferred signal processing for a GPS half channel.

FIG. 6 shows how the GPS tracking is implemented for a half channel. The raw, real time digital GPS data measurements 200 are input and mixed at a first mixer 202 with a specific version of the GPS Code provided by a code generator 204, operating on feed forward data 201 obtained from the Iridium satellite. Two identical half channels make up a full channel, as will be described in greater detail below.

The output of the code mixer is mixed again at a second mixer 206 with an internally synthesized version of the GPS carrier generated by the carrier tracking loop of the receiver at a synthesizer 208. An accumulator 210 builds up one-millisecond samples of the incoming channel whose boundaries align with the received signal epoch. This integration boundary is chosen to be general enough to handle short overall integration times, such as one millisecond, but to also accommodate longer integration times. According to the GPS signal specification [ICD-200], data bit boundaries will also occur on 20 ms boundaries aligned with the received signal epochs. Therefore, the one-millisecond epoch boundary can never cut across a data bit.

For dynamic applications, a MEMS Inertial Reference Unit (IRU) 114 is coupled to the system at a third mixer 212. The inertial reference unit 114 is shown in dotted lines may be included where the dictates of the application make the IRU additionally useful. In more demanding applications, an inertial-grade IRU may be desirable. The IRU senses inertial vector translation, $x_1$, and attitude motion, represented by the 3×3 attitude rotation matrix A, of the user platform. With prior knowledge of the antenna mounting lever arm, b, with respect to the body frame of the user platform, it is possible to use the inertial to project the antenna motion into the line of sight of the satellite, $\hat{s}$, to yield a complex, real-time phase correction for each channel. The net effect is to subtract out short-term user motion and enable long integration times on the GPS signal.

The Iridium receiver (not shown) demodulates the feedforward GPS data bits for all the GPS satellites in view via the Iridium system. A decommutator 214 in the user receiver sorts out the incoming bit stream within the Iridium data frame and temporally positions the reference GPS bits in proper phasing for each channel. To keep track of delays, the GPS data is time tagged according to the GPS time at which it was broadcast from the GPS satellite. In general, these GPS data bits are subject to a latency of around 80 ms as they propagate through space from the GPS satellite to the ground reference receiver. An additional latency of order 10-90 ms from the time they are received at the ground reference station will accrue from transmission to the user from the ground station due to propagation delay through the Iridium system.

To ensure that the real-time GPS data bits are appropriately delayed and aligned in time with the decommutated feedforward data bits produced at a decommutator 214, a first-in-first-out (FIFO) synchronization buffer 216 is employed, receiving and buffering data from the accumulator (optionally mixed with the IRU data). The GPS time tags on each data stream are used to ensure that the same millisecond epochs of data are mixed together. The FIFO 216 holds each batch of millisecond measurements from the accumulators until they are exactly time aligned with the incoming data bits from Iridium. Then, the Iridium data bit stream is used to wipe off the 50 bps data modulation from the incoming GPS signal at a fourth mixer 218. The result is a true coherent GPS carrier phase detector, at accumulator 220, extendible from 1 ms to longer integration times that are limited by the quality of the inertial unit—potentially well beyond 20 seconds for an inertial grade unit.

Figure 7:
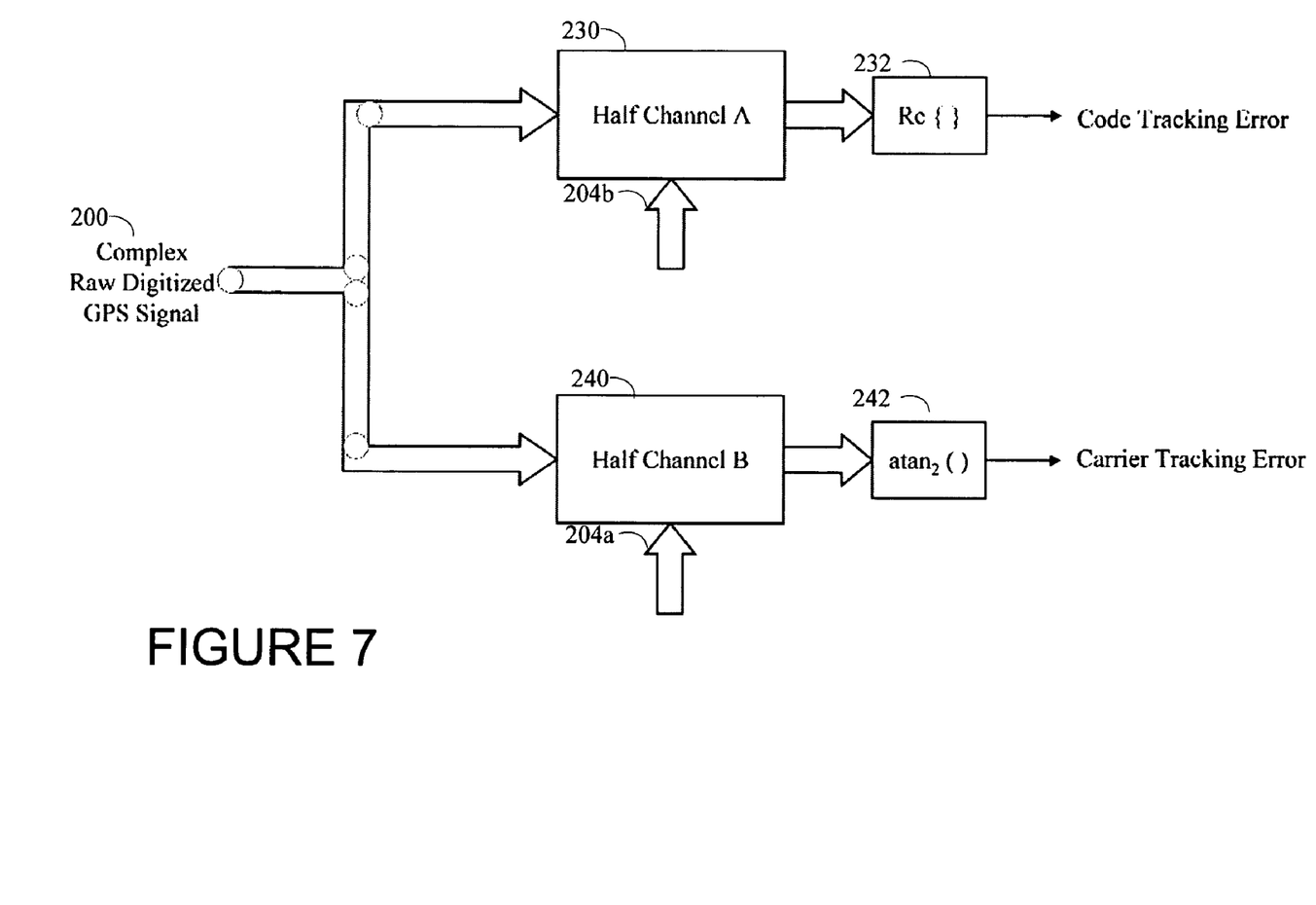
FIG. 7 is a block diagram for a GPS receiver for processing a single channel.

Each channel is formed by two half channels. As shown in FIG. 7, the output for each half channel may be interpreted as follows: if the half channel code generator is commanded to synthesize an early minus late code sequence 204b, then the real component 232 of the output of that half channel 230 will correspond to the code phase tracking error for that satellite. If the half channel code generator is commanded to synthesize a punctual code sequence 204b, then the output 242 of that half channel 240 will correspond to the carrier phase error.

Figure 8:
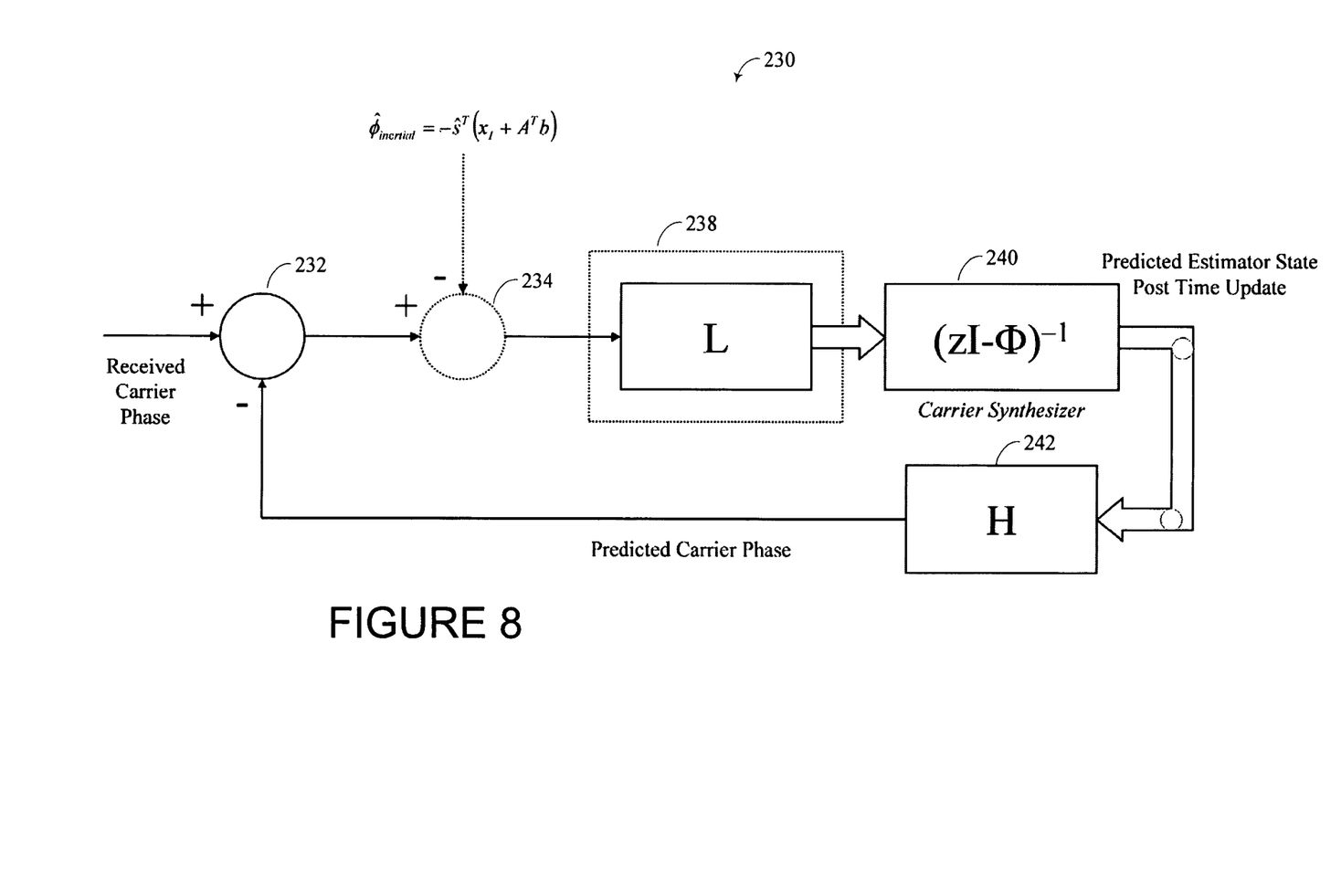
FIG. 8 is a block diagram of a GPS carrier tracking loop estimator model.

The resulting carrier phase tracking error is fed into the estimator 250 shown in FIG. 8. This general-purpose estimator 250 is capable of estimating the carrier phase and any number of its time derivatives upon receipt of the latest phase tracking error measurement, $\Delta\phi$. At the onset, the uncorrected received carrier phase is fed to a carrier synchronization node 232 capable of adjusting the phase of the incoming carrier according to a phase correction signal 242.

In a presently preferred embodiment, a third order tracking loop is implemented—mostly to take into account satellite orbital motion. Therefore, there are three states, $\phi$, to the tracking loop estimator/synthesizer: phase, phase velocity, and phase acceleration. The following matrix dynamic model, $\Phi$, is employed to model the carrier phase synthesizer in its progress from the a posteriori estimate at one epoch to the a priori estimate at the next:

$$\begin{bmatrix} \hat{\varphi} \\ \dot{\hat{\varphi}} \\ \ddot{\hat{\varphi}} \end{bmatrix}_{k+1} = \Phi \begin{bmatrix} \hat{\varphi} \\ \dot{\hat{\varphi}} \\ \ddot{\hat{\varphi}} \end{bmatrix}_k = \begin{bmatrix} 1 & T & \frac{1}{2}T^2 \\ 0 & 1 & T \\ 0 & 0 & 1 \end{bmatrix} \begin{bmatrix} \hat{\varphi} \\ \dot{\hat{\varphi}} \\ \ddot{\hat{\varphi}} \end{bmatrix}_k$$

The sole observable, as encoded in the observability matrix H=[1 0 0], is the measured tracking error, $$\Delta\varphi_k = \varphi_k - \begin{bmatrix} 1 & 0 & 0 \end{bmatrix} \begin{bmatrix} \bar{\varphi}_k \\ \dot{\bar{\varphi}}_k \\ \ddot{\bar{\varphi}}_k \end{bmatrix} = \varphi_k - \bar{\varphi}_k$$

Using optimal estimation theory, at a block 238, an optimal gain, L, may be chosen to yield a measurement update equations as follows from the tracking error:

$$\begin{bmatrix} \hat{\varphi} \\ \dot{\hat{\varphi}} \\ \ddot{\hat{\varphi}} \end{bmatrix}_k = \begin{bmatrix} \bar{\varphi} \\ \dot{\bar{\varphi}} \\ \ddot{\bar{\varphi}} \end{bmatrix}_k + \begin{bmatrix} L_1 \\ L_2 \\ L_3 \end{bmatrix} \Delta\varphi_k$$

Each epoch this correction vector is sent to the carrier phase synthesizer 240 to adjust its advance. As a result, a predicted carrier phase 242 is fed to the carrier synchronization node 232 to effectively delay or advance carrier. The end result is an effectively optimal carrier phase tracking loop 230. Care must be taken to ensure that the latency from Iridium does not amount to a significant portion of the sample interval, although this is unlikely when the sample interval is longer than a second. If latency is an issue, then it may be advisable to implement a dynamic model that takes into account the delay. Also, in the preferred embodiment, a carrier phase synthesizer 240 effectively provides third order functionality from one integration interval to the next. The reason for this is to cover those cases where the integration interval becomes significant with respect to one second.

At such integration periods, it becomes preferable for an inertial sensor to be corrected to align the received and corrected carrier phase to account for any user motion over the integration interval. At an inertial carrier synchronization node 234, consistent with FIG. 6, the measured tracking error becomes $$\Delta\varphi_k = \varphi_k - \begin{bmatrix} 1 & 0 & 0 \end{bmatrix} \begin{bmatrix} \bar{\varphi}_k \\ \dot{\bar{\varphi}}_k \\ \ddot{\bar{\varphi}}_k \end{bmatrix} - \hat{\phi}_{inertial(k)} = \varphi_k - \bar{\varphi}_k - \hat{\phi}_{inertial(k)}$$

where $$\hat{\phi}_{inertial(k)} = -s^T(\hat{x}_{inertial(k)} + \hat{A}_k b)$$

The phase correction at the inertial carrier synchronization node 234 is the projection of the position of the GPS antenna, as estimated by a tightly coupled inertial unit, into the line of sight to the given GPS satellite.

Figure 9A:
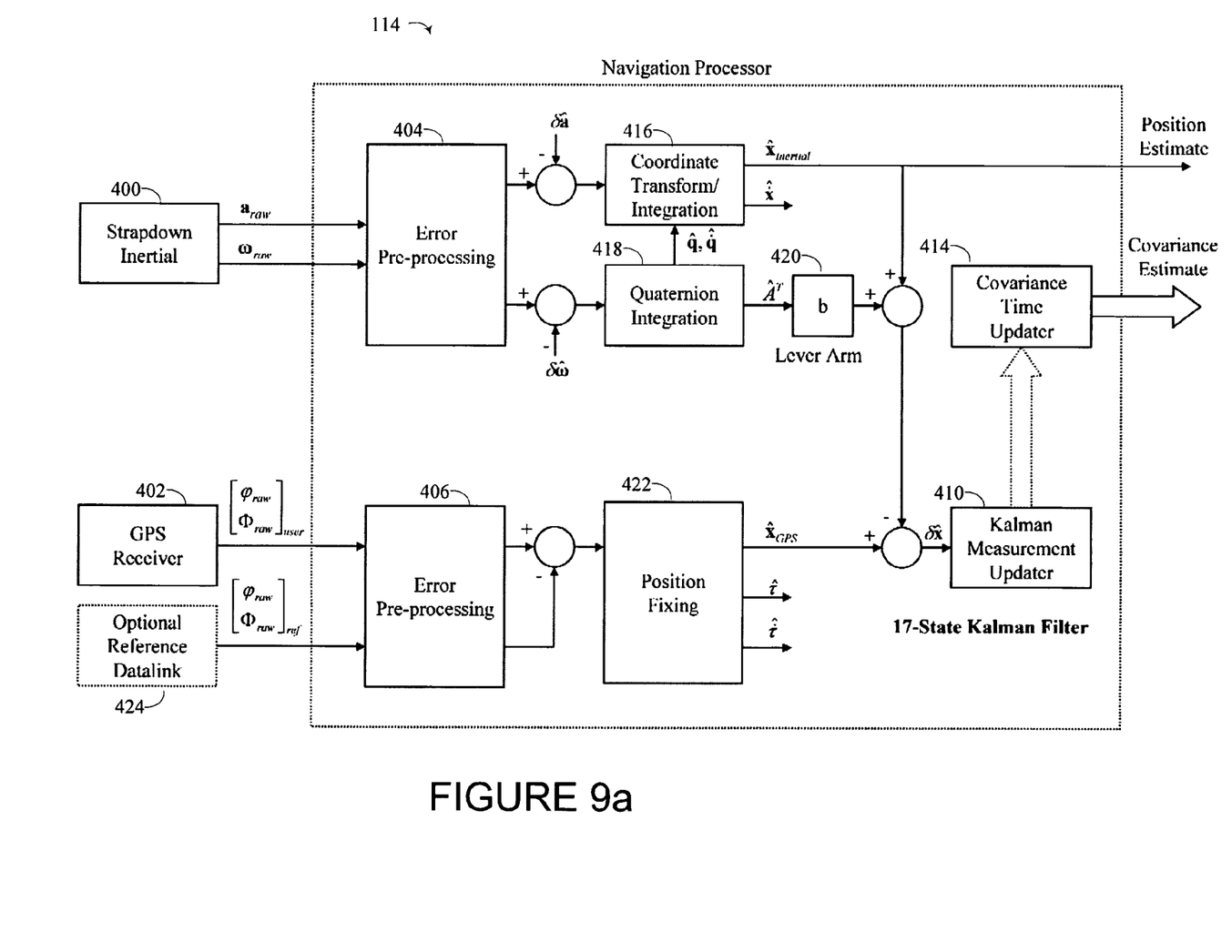
FIG. 9a is a block diagram of an inertial navigation processor.

A general model for a suitable inertial reference unit 114 is given in FIG. 9a. The sensors for the inertial reference unit are optionally of the strapdown inertial variety rather than a gimbaled unit though either will serve. Therefore, the inertial reference unit includes a strapdown inertial navigation system 400.

Strapdown inertial navigation systems 400 are rigidly fixed to the moving body. Therefore, strapdown inertial reference units move with the body, their gyros experiencing and measuring the same changes in angular rate as the body in motion. The strapdown inertial reference unit 400 contains accelerometers to measure changes in linear rate in terms of the body's fixed axes. The body's fixed axes serve as a moving frame of reference as opposed to the constant inertial frame of reference. The navigation computer uses the gyros' angular information and the accelerometers' linear information to calculate the body's 3D motion with respect to an inertial frame of reference.

A 17-State Kalman Filter estimates position, velocity, accelerometer bias, attitude, gyro bias, clock bias, and clock bias rate 410. The inertial error processor block 404 corrects pre-calibrated parameters, including scale factor and alignment errors. Next the corrected measurements pass through the time update blocks performing coordinate transform at a block 416, including the addition of the accelerometer and gyro bias states and the integration of the strapdown measurements into position, velocity, and attitude. Quaternion integration occurs at a block 418. The pre-calibrated lever arm, b, is used to calculate the estimated position of the user antenna at a block 420.

On the GPS receiver 402 side of the state time update blocks, the error processor block 406 applies corrections such as for atmospheric/ionospheric effects, time tag alignments, and blending code and carrier. If a differential reference station is available as in the preferred embodiment, measurements from the GPS receiver are then calibrated against the reference measurements supplied through a datalink 424.

An error processor 406 then applies the scalar receiver clock and clock bias estimates to the raw measurements for position fixing at a block 422. As described in reference to FIGS. 6, 7, and 8 position fixing occurs at a block 422. A covariance time update block 414 propagates the state covariance estimate. In a conventional tightly coupled inertial, the measurement update is derived from the difference between the GPS position estimate and the inertial position estimate.

Figure 9B:
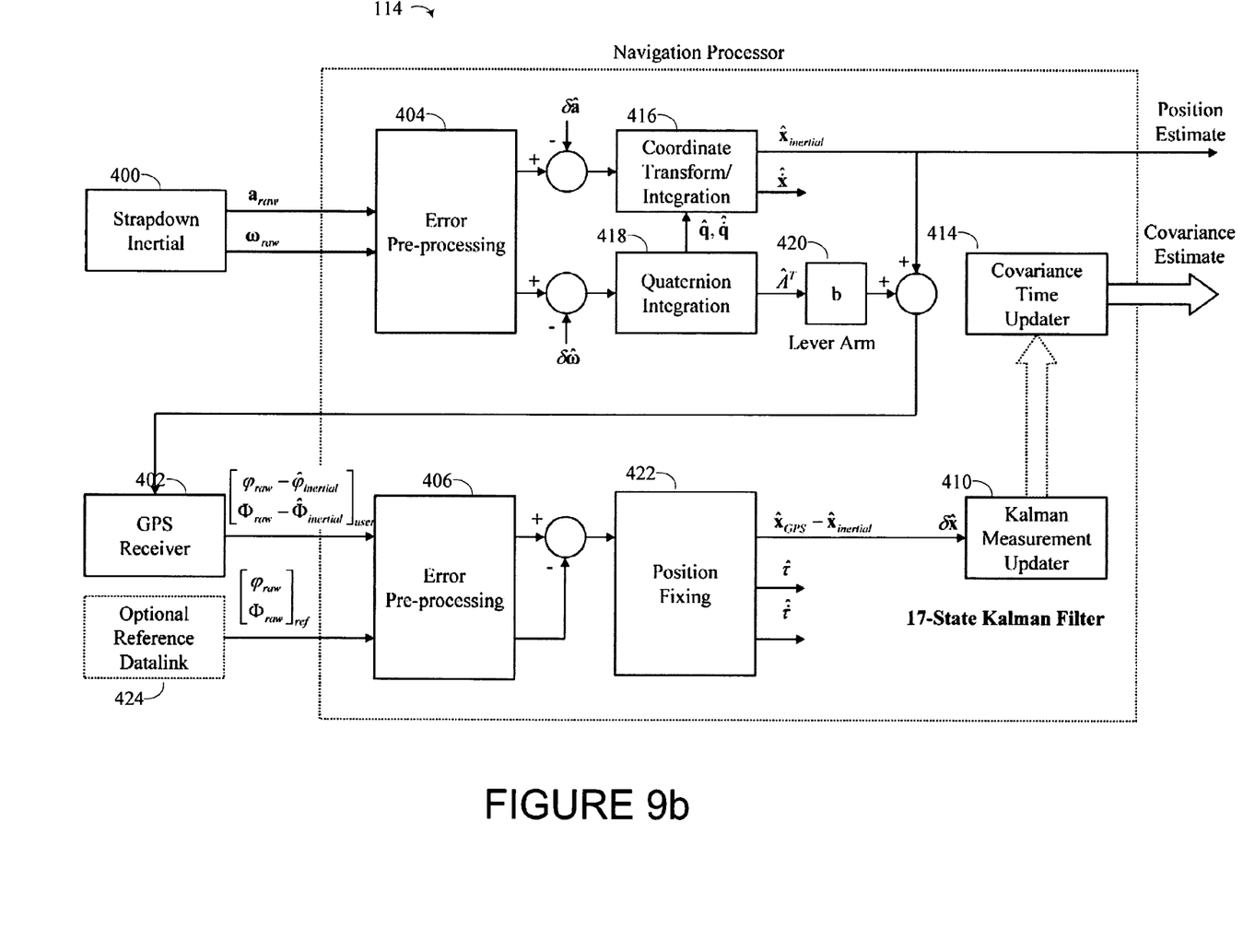
FIG. 9b is a block diagram of a preferred inertial navigational processor.

FIG. 9b shows an ultra-tightly coupled inertial unit in a presently preferred embodiment. Unlike the embodiment portrayed in FIG. 9a, the difference between GPS and the inertial position is taken in the receiver at the tracking loop level, as shown in FIGS. 6 and 8. The inertial position and attitude estimates are routed into the receiver tracking loops. The time update difference is mathematically identical to that of FIG. 9a except that the receiver-tracking loop is now able to withstand significant disturbances during the tracking loop operation under dynamics with an impaired signal.

Figure 10:
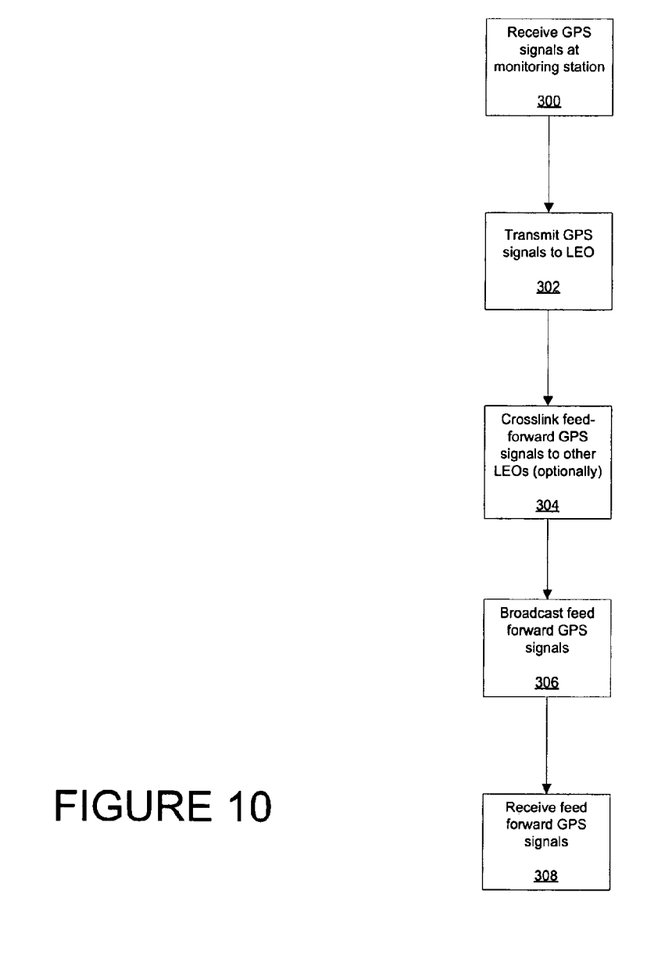
FIG. 10 is a flow diagram of a preferred method in accordance with the present invention.
Figure 11:
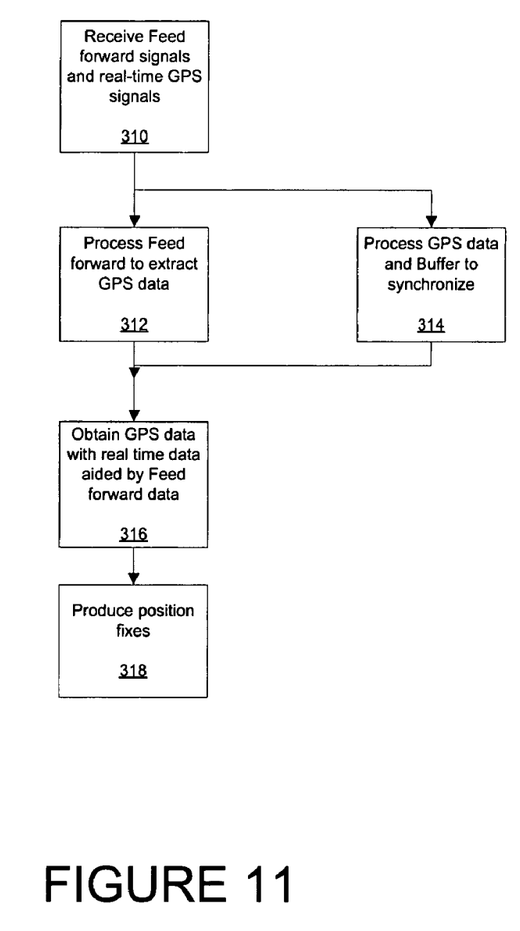
FIG. 11 is a flow diagram of a preferred method in accordance with the present invention.

The method for implementing the present invention is further described with references to FIGS. 10 and 11. In a first step 300, a monitoring station, such as a ground monitoring and control station 50 (see FIG. 3) receives GPS signals from those GPS satellites in its field of view. The monitoring station modulates those signals in accordance with the Iridium satellite specification and transmits the received and modulated GPS data to an Iridium satellite in a second step 302. It should be understood that other LEO satellites other than Iridium may be used. Indeed, while LEO satellites are preferred embodiment, any broad-footprint data channel will enable the communication link to supply the modulated GPS data.

Once received by an initial Iridium satellite, at a next step 304 the GPS feed-forward data is cross-linked to other Iridium satellites. Any number of cross-linkings of the feed forward data may occur, including no cross-links at all, consistent with this invention. Ultimately, the feed forward data is broadcast toward the earth 306 for receipt by any number of users, who receive the feed forward data at a final step 308.

With reference to FIG. 11, the user receives real time GPS signals and feed forward GPS data via the Iridium satellite, at step 310. The user receiver processes both data streams, extracting the feed forward GPS data at step 312 and, generally in parallel, processing the real time GPS data and buffering it at a step 314 in order to synchronize it with the feed forward data. The feed forward data is then used to supplement the real time data 316, enabling the system to obtain and use accurate GPS data at the user even under jamming or interference conditions. Finally, the receiver produces position fixes 318 from the processed GPS data, optionally by an inertial reference unit.

While the preferred embodiment of the invention has been illustrated and described, as noted above, many changes can be made without departing from the spirit and scope of the invention. For instance, LEO satellites are preferred embodiment, but any broad-footprint, over-the-horizon data channel is a candidate as well. Accordingly, the scope of the invention is not limited by the disclosure of the preferred embodiment. Instead, the invention should be determined entirely by reference to the claims that follow.

What is claimed is:

1. A device comprising:
a first receiver configured to receive a real-time GPS signal from a GPS satellite;
a second receiver, coupled to the first receiver, configured to receive a feed-forward GPS signal from a second satellite different from the GPS satellite, the feed-forward GPS signal containing identical GPS data as the real-time GPS signal but being received at a later time than the real-time GPS signal;
a digital signal processor configured to process the real-time GPS signal and the feed-forward GPS signal, wherein the digital signal processor includes:
a first mixer configured to mix the real-time GPS signal with a GPS code;
a second mixer configured to mix an output of the first mixer with a GPS carrier;
an accumulator configured to accumulate samples on an output of the second mixer;
a decommutator configured to temporally position GPS bits in the feed-forward GPS signal in proper phasing; and
a third mixer configured to mix the temporally-positioned GPS bits with the accumulated samples, the GPS code and the GPS carrier being derived from the feed-forward GPS signal; and
the processing of the digital signal processor including extracting feed-forward GPS data bits from the feed-forward GPS signal and supplementing real-time GPS data in the real-time GPS signal with the extracted feed-forward GPS data bits, at least where the real-time GPS signal is impaired due to missing or attenuated data bits in the real-time GPS data signal.

2. A system for determining the position of a user based on GPS signals, comprising:
a plurality of GPS satellites, each of the plurality of GPS satellites configured to transmit real-time GPS signals to the user;
a first LEO satellite configured to receive signals transmitted from the earth, to optionally cross-link the signals to a plurality of additional LEO satellites, and to broadcast the signals to users;
a monitoring and control station configured to receive the real-time GPS signals from at least one of the plurality of GPS satellites and to transmit feed-forward GPS signals based on the real-time GPS signals to the first LEO satellite; and
a user receiver configured to receive the real-time GPS signals and the feed-forward GPS signals from one of the first LEO satellite or the plurality of additional LEO satellites, the user receiver including:
a first receiver configured to process the real-time GPS signal, the first receiver including a digital signal processor and a memory coupled to the digital signal processor;
an inertial reference unit coupled to the first receiver; and
a second receiver coupled to the first receiver, the second receiver configured to process the LEO feed-forward GPS signal and to send to the first receiver GPS aiding data, whereby the first receiver is configured to acquire a more accurate GPS signal by supplementing the first real-time GPS signal with the first feed-forward GPS signal;
whereby the user receiver uses the real-time GPS signals and the feed-forward GPS signals and inertial aiding data from the inertial reference unit to determine the position of the user.

3. The system of claim 2, wherein the first receiver further comprises a synchronization buffer configured to synchronize the real-time GPS signal with the feed forward GPS signal.

4. The system of claim 3, further comprising a common clock coupled to the first receiver and the second receiver.

5. The system of claim 4, further comprising an antenna adapted to receive transmissions from at least one of the plurality of GPS satellites and from at least one of the first LEO satellite and the plurality of additional LEO satellites.

6. The system of claim 5, further comprising a filter in signal communication with the antenna, and a pre-amplifier in signal communication with the filter and the first and second receiver.

7. The system of claim 2, wherein the first LEO satellite and the plurality of additional LEO satellites comprise Iridium satellites.

8. A method comprising:
receiving a real-time GPS data stream from a satellite in a first GPS satellite network;
receiving a feed-forward data stream from a satellite in a second satellite network different from the first GPS satellite network, the feed-forward data stream containing feed-forward GPS data that is identical to real-time GPS data contained by the GPS data stream and wherein the feed-forward data stream was received at the second satellite network from a ground control station, the feed-forward data stream being received at a later time than the real-time GPS data stream; and
processing, using a digital signal processor, the real-time GPS data stream and the feed-forward data stream, the processing including:
extracting feed-forward GPS data bits from the feed-forward data stream; and
supplementing the real-time GPS data with the extracted feed-forward GPS data bits, so as to fill in gaps in the real time GPS data only where the real-time GPS data is impaired due to missing or attenuated data bits in the real-time GPS data stream;
wherein processing the real-time and feed forward signals includes:
mixing the real-time signal with a GPS code to produce a first mixed signal;
mixing the first mixed signal with a GPS carrier to produce a second mixed signal;
accumulating samples of the second mixed signal;
temporally positioning GPS bits of the feed-forward signal in proper phasing; and
mixing the temporally-positioned GPS bits with the accumulated samples;
wherein the GPS code and GPS carrier are derived from the feed-forward data.

9. The method of claim 8, further comprising using an antenna to receive transmissions from the GPS satellite network; using an inertial reference unit to sense motion of the antenna; and using the digital processor to project the antenna motion into line of sight of a GPS satellite to yield phase correction of the GPS carrier.

* * * * *